United States Patent [19]

Murchison et al.

[11] 3,819,516

[45] June 25, 1974

[54] TREATMENT OF AQUEOUS SOLUTIONS CONTAMINATED WITH SOLUBLE ORGANIC MATERIALS

[75] Inventors: Craig B. Murchison; Robert E. Bailey; Ronald W. Diesen, all of Midland, Mich.

[73] Assignee: The Dow Chemical Company, Midland, Mich.

[22] Filed: Apr. 9, 1973

[21] Appl. No.: 349,518

[52] U.S. Cl. .................... 210/63, 21/58, 21/DIG. 2
[51] Int. Cl. .............................................. C02b 3/08
[58] Field of Search ............ 210/50, 59, 63, 64, 48; 99/218; 21/DIG. 2, 58; 204/157.1

[56] References Cited
UNITED STATES PATENTS

| | | | |
|---|---|---|---|
| 1,420,046 | 6/1922 | MacGregor et al. | 210/63 |
| 1,679,256 | 7/1928 | Muller et al. | 99/218 |
| 3,121,673 | 2/1964 | Riemenschneider et al. | 204/157.1 R |

FOREIGN PATENTS OR APPLICATIONS

| | | | |
|---|---|---|---|
| 112,149 | 1/1918 | Great Britain | 210/63 |

Primary Examiner—Samih N. Zaharna
Assistant Examiner—Benoit Castel
Attorney, Agent, or Firm—Bruce M. Kanuch; Stephen R. Wright

[57] ABSTRACT

An aqueous liquor containing oxidizable organic materials is treated in the following manner to oxidize the organics. There is provided in solution, in the organically polluted aqueous liquor, a catalytic quantity of iron ions. The pH of the aqueous liquor is adjusted to 4 or below and then treated with oxygen and light energy having a wave length of 5800 A or less. The principle products of the oxidation process are $CO_2$, water and lower molecular weight organics.

9 Claims, No Drawings

TREATMENT OF AQUEOUS SOLUTIONS CONTAMINATED WITH SOLUBLE ORGANIC MATERIALS

BACKGROUND OF THE INVENTION

Numerous physical, biological and chemical processes have been developed for treating organically polluted aqueous liquors to reduce the chemical and biological oxygen demand thereof.

In biological processes, purification is effected through the agency of microorganisms, either bacteria or protozoa. The activated sludge process is exemplary of this group. In the activated sludge process an organically polluted aqueous liquor is held in a sedimentation basin while it is aerated to effect oxidation of the organic matter through the agency of microorganisms. This process has several disadvantages, such as the long periods of time required and the poisoning of the microorganisms by constituents brought in by the aqueous liquor, e.g. halide ions, too great a concentration of phenols, etc. Also, there are problems associated with disposing of the sludge and the like.

Another class of technology involves catalytically promoted oxidation processes. U.S. Pat. Nos. 2,690,425; 2,962,421; 3,442,802 and German Pat. No. 10,990 are examples of these types of processes. One of these processes involves the oxidation of organics with oxygen in the presence of a solid oxidation catalyst such as a metal oxide or salt in which the metal ion can be oxidized at least two valence states. In all these processes the metal is employed in a high valence state. In some processes solid manganese dioxide, iron oxide or iron hydroxide and the like can be employed. These processes are all characterized by the fact that when the catalyst is reduced in the process it must be replenished. For example, it is suggested in U.S. Pat. No. 2,962,421 that when a $Mn^{+4}$ is reduced to $Mn^{+2}$, the $Mn^{+2}$ goes into solution and is thereafter ineffective as an oxidation catalyst.

The present invention concerns a catalytic oxidation process wherein iron ions catalyze the oxygen oxidation of organics in the presence of light.

SUMMARY OF THE INVENTION

Aqueous liquors containing oxidizable organics are mixed with a source of oxygen and iron ions while the pH of the liquor is maintained at about 4 or less. The liquor is also subjected to light waves having a wave length of less than about 5800 A during the oxidation process.

DETAILED DESCRIPTION OF THE INVENTION

Aqueous solutions containing oxidizable organics such as waste streams which come from chemical plants, distilleries, smelters, sewage systems and the like can be treated according to the practice of the present invention to oxidize the organics contained therein and correspondingly reduce the chemical, biochemical and total oxygen demand (COD, BOD and TOD) of the liquor. The process can be used in conjunction with other known waste treatment processes if desired. The process is more efficient when substantially all the reactants are dissolved in the aqueous liquor. However, some solid organics can be oxidized by the process of the invention.

Classes of organic materials which can be oxidized in the present method include all organic compounds which form essentially water soluble complexes with ferric ions in an aqueous environment. Such organic compounds contain electron donor atoms such as oxygen, nitrogen, sulfur and other like atoms. Organic compounds which can be oxidized include, for example, aliphatic and aromatic carboxylic acids, e.g. formic, acetic, propionic, 2,4-dichlorophenoxy acetic, chloropropionic, phenoxy acetic, glycolic, chloro acetic, lactic, butyric acids; mono and polyhydric alcohols, e.g. methanol, ethanol, propanol, butanol, ethylene glycol, propylene glycol, butylene glycol, glycerine, etc.; aldehydes, e.g. formaldehyde, acetaldehyde and propionaldehyde; lower alkyl esters of the aforesaid and other acids, e.g. methyl acetate, ethyl acetate, propyl acetate, methyl formate, ethyl formate, propyl formate and higher molecular weight vaporizable esters; ketones such as acetone and other such similar chemicals as: dibasic acids, cyanogen compounds, amines, amides, carbohydrates, cellulosic materials, sugars, yeasts and the like.

The organics can be present in amounts up to the saturation level in the aqueous liquor. The process can be carried out in such aqueous liquors as, for example, concentrated brines, e.g. chloride brines, and the like.

The products of oxidation include volatile products such as $CO$, $CO_2$ and $CH_4$ and water soluble and insoluble lower molecular weight organic compounds.

The process is carried out at a temperature ranging from the freezing point of the aqueous solution up to the boiling point thereof at atmospheric pressure. Elevated or reduced pressures can be employed if desired. The use of such pressures will of course effect the maximum and minimum of the temperature range. Elevated temperatures are not necessary to the practice of the invention, and, therefore, the process is preferably carried out at ambient atmospheric temperatures.

The aqueous liquor is continuously contacted with a source of oxygen, air, oxygen-fortified air and/or a compound which will give up oxygen under the other specified conditions of the invention. Generally it is preferred to provide more than a surface source of oxygen, i.e. more than that supplied by a holding pond in contact with the atmosphere. Mechanical methods of supplying aeration to the aqueous liquor which are well-known in the art can be employed. Generally air under pressure is distributed into the aqueous system to be treated by the use of mechanical aeration devices and the like. Preferably, oxygen should be supplied in excess of that stoichiometrically required for oxidation of the organic compounds present in the aqueous liquor. The process can be practiced using oxidation ponds of which the depths, mixing, aeration techniques and the like are well-known in the art. See for example the description of oxidation ponds in Kirk Otmer's *Encyclopedia of Chemical Technology*, pages 122–123, Vol. 22, 2nd Edition.

A light source is also necessary to the practice of the present invention. An effective light source having a wave length of less than about 5800 A is preferred. Sunlight or any artificial supply of light can be employed in the process. Light sources, including the various lamps and the like which can be employed are well-known in the art. Reference may be had to Kirk Otmer's *Encyclopedia of Chemical Technology*, pages 331–354, Vol. 15, 2nd Edition, for a general discussion of photochemical technology including a detailed description of light sources and the like. Preferably, a light source having an effective wave length of 5000 to 2000 A is employed.

The aqueous liquor may be subjected to variable light quantities, depending on the amount of oxidation per unit time to be effected. Where substantially all the material in the aqueous liquor is to be oxidized, the intensity of the light source may range from about 0.1 to about 100 k watt-hours per pound of oxidizable organic to be oxidized. Generally less than 100 k watt-hours per pound of organic compound is sufficient.

The iron ion source may be ferrous, ferric or a mixture thereof. Preferably the iron is soluble in the reaction system, however, a portion may be present in a finely dispersed state. In the practice of the present invention it is theorized that the ferrous ion which is produced upon the reduction of ferric ion (which in turn catalyzes the oxidation of the organic compounds) is auto-oxidized in the system to ferric ion thus providing a self-generating form of ferric ions. Ferric chloride, ferrous chloride, $Fe_2(SO_4)_3$, $FeSO_4$, $Fe(NO_3)_3$, $Fe(NO_3)_2$, $Fe(ClO_4)_3$, $Fe(ClO_4)_2$ and other water soluble iron compounds can be employed as a source of iron. Iron is employed in a catalytic amount and can be present in an amount ranging from bout 1 to about 500 parts per million (ppm) in the aqueous liquor. The exact quantity will depend to some degree on the natural extinction coefficient (transparency) or turbidity of the liquor to be treated, temperature conditions, quantity of oxygen and the like. A preferred range is from about 10 to about 50 ppm of iron in the aqueous liquor.

It has been found critical to the practice of the present invention that the pH of the aqueous solution should be about 4 or below during the oxidation of the organics present therein. Usually acids or acid producing materials such as HCl, $HNO_3$, $H_2SO_4$, $HClO_4$ can be employed to maintain the proper pH. A pH of from about 2 to about 3 is preferred.

By practicing all the parameters of the present invention the COD, BOD and TOD of an organically polluted aqueous liquor can be reduced. The products of the oxidation of the organics include volatile carbon containing compounds such as $CO_2$, CO, $CH_4$, as well as other water soluble and water insoluble materials. Solid products can be removed from the aqueous liquor by well-known methods of flocculation, precipitation, filtration and the like.

Quantum yield as used herein is a measure employed in photochemical reactions to indicate the efficiency of the reaction system. Quantum yield is equal to the number obtained by dividing the moles of product formed or reaction products removed in the reaction system by einstein (moles of quanta) absorbed by the reactant. For example, a quantum yield equal to one means that one mole of product is formed for each einstein of photons absorbed by a reactant. Known methods may be employed for determining quantum yield. Actinometry, for example, is a method of determining the quantity of photons absorbed in a system. The actinometer is a device which can be employed for this determination. Other quantitative methods can be employed to determine the amount of product produced or the reactant used up and these quantities then can be employed to determine the quantum yield. In any reaction system employing a photochemical process it is generally preferred to maximize the quantum yield of the system. The present invention concerns a process for maximizing the quantum yield of photoautooxidation systems containing iron atoms as a portion of the reaction mechanism.

A quantity of an organic polluted aqueous liquor is subjected to the parameters of the present invention until a desired quantity of the organic pollutants are oxidized to form volatile, water insoluble or non-polluting soluble products.

The following examples will facilitate a more complete understanding of the practice of the present invention.

EXAMPLE 1

Into 1800 ml of an aqueous solution containing 5 per cent by weight of sodium chloride was dissolved 5 grams of glycolic acid (approximately 900 ppm). There was also dissolved therein 0.314 gram of $FeCl_2 \cdot 4H_2O$ as an iron source (50 ppm of Fe). The glycolic acid was oxidized by sparging the system with oxygen and providing as a light source a Hanovia 100 watt medium pressure Hg vapor lamp submerged in the aqueous reaction system. This lamp provided a useful wave length range of from about 2000 to 4000 A. The temperature of the reaction system was maintained at about 33°C. The pH of the system was varied with HCl and the total organic carbon (TOC) removed (in ppm per minute, i.e. loss per min.) and the quantum yield (based on the moles of volatilized carbon) of the reaction system were determined at each pH value. The results of these tests are set forth in the following Table I.

TABLE I

| Test No. | pH | TOC Loss Per Minute | Quantum Yield |
|---|---|---|---|
| 1 | 1 | 0.43 | 0.091 |
| 2 | 2 | 1.7 | 0.36 |
| 3 | 3 | 1.95 | 0.41 |
| 4 | 4 | 2.1 | 0.44 |
| 5 | 5 | 0.075 | 0.016 |
| 6 | 6 | 0.0 | 0.0 |

An analysis of the solution which had a pH value of 3 (Test No. 3) after 1400 minutes indicated that there was only about 200 ppm of organic carbon in solution. This organic carbon consisted essentially of methylene glycol and formic acid.

EXAMPLE 2

Into 700 ml of an aqueous solution containing between 10 to 15 per cent by weight of sodium chloride was dissolved 5 grams of glycolic acid. To one sample of the solution was added 50 ppm of iron as $FeCl_2 \cdot 4H_2O$ and to another sample was added 50 ppm of iron as $FeCl_3 \cdot 6H_2O$. The pH values of the solution were adjusted to 2.5 with HCl. The solutions were sparged with oxygen in the presence of light from four 400 watt Mazda medium pressure Hg lamps emitting a useful wave length range of from about 3000 to 4000 A. The temperatures of the solutions were maintained at about 20°C. The quantum yield (determined for a time period of 400 minutes) of the solution containing $FeCl_2 \cdot 4H_2O$ was 0.18 and for the solution containing $FeCl_3 \cdot 6H_2O$ was 0.17.

EXAMPLE 3

The procedure of Example 1 was repeated employing a pH of 2.5 except that the aqueous liquor did not contain any sodium chloride. The TOC loss/min. and quantum yield were 2.23 and 0.47, respectively, after a period of 400 minutes. There was essentially no organic carbon in solution at the end of 400 minutes.

EXAMPLE 4

The effect, if any, of varying the quantity of iron in an oxidation system of the invention was determined as follows: 1800 ml of a 5 per cent by weight NaCl solution was employed as the reaction system. The same light source was employed as in Example 1. Glacial acetic acid (2.7 grams) was dissolved into the aqueous brine and the TOC loss/min. and quantum yield for the solutions containing various quantities of Fe (added as $FeCl_3 \cdot 6H_2O$) were determined. The temperature of the aqueous solution was about 30°C and the pH of the solution was 2.5. The results are set forth in the following Table II.

TABLE II

| Test No. | Fe (ppm) | TOC Loss/Min. | Quantum Yield |
| --- | --- | --- | --- |
| 1 | 25 | 0.31 | 0.065 |
| 2 | 50 | 0.28 | 0.059 |
| 3 | 75 | 0.26 | 0.055 |
| 4 | 250 | 0.11–0.16 | 0.023–0.033 |

These results indicate that an excessive quantity of iron in the system depresses the quantum yield of carbon oxidation even though light absorption increases because of the increased amount of iron present in the solution.

EXAMPLE 5

In a manner similar to that set forth in Example 4, 1800 ml of an aqueous solution containing 5 grams of lactic acid and various amounts of iron (added as $FeCl_3 \cdot 6H_2O$) was treated with oxygen and light at a pH of 2. The TOC loss/min. and quantum yield for 50 ppm of iron were 1.09 and 0.64, respectively. The TOC loss/min. and quantum yield for the system containing 1000 ppm of iron were 0.28 and 0.16, respectively.

EXAMPLE 6

An 1800 ml aqueous solution containing 1570 ppm of propylene glycol was treated in the following manner. The pH of the solution at 25°C was adjusted to 2.5 with $HClO_4$. To the solution was then added about 50 ppm pf iron (as $FeCl_3 \cdot 6H_2O$). The solution was sparged with oxygen and subjected to a 100 watt light source having an effective wave length range of from about 3000 to 4000 A. The solution was analyzed for propylene glycol, lactic acid and acetic acid at various time intervals. The results of these tests are set forth in the following Table III.

TABLE III

| Time (minutes) | Propylene Glycol (ppm) | Lactic Acid (ppm) | Acetic Acid (ppm) |
| --- | --- | --- | --- |
| 0 | 1570 | 0 | 0 |
| 428 | 971 | 120 | 147 |
| 1346 | 224 | 272 | 480 |
| 2764 | 0 | 0 | 475 |

The above tests were repeated employing an aqueous solution containing 10 per cent by weight of NaCl and 2435 ppm of propylene glycol. The results of this test are set forth in the following Table IV.

TABLE IV

| Time (minutes) | Propylene Glycol (ppm) | Lactic Acid (ppm) | Acetic Acid (ppm) |
| --- | --- | --- | --- |
| 0 | 2435 | 0 | 0 |
| 1306 | 1794 | 298 | 115 |
| 2759 | 1360 | 452 | 342 |
| 4200 | ~604 | 400 | 817 |
| 8520 | <100 | 127 | 1151 |
| 10760 | *N.D. | *N.D. | 798 |

*Not detectable by T-60 NMR analysis

EXAMPLE 7

A 4'×4'×1' container placed outdoors in Michigan was filled to a depth of 6 inches with an aqueous solution containing approximately 10 per cent by weight of NaCl, 4160 ppm glycolic acid, 2400 ppm of acetic acid and 514 ppm of chloroacetic acid. The pH of the solution was maintained at between about 2.5 and 3.6 with HCl. An air hose was submerged in the aqueous solution and the solution sparged with air at the rate of about 2 cubic feet per minute. Approximately 20 ppm of iron was placed in solution at the beginning of the test as $FeCl_3 \cdot 6H_2O$. No additional iron was added. The light source was sunlight. Over a period of 42 days (midAugust to late September) the aqueous solution was periodically analyzed for glycolic acid, acetic acid, methylene glycol and chloroacetic acid.

The results of this test are set forth in the following Table V.

TABLE V

| Time (days) | pH | TOC (Mg. C/ Liter) | TOD (Mg. 0/ Liter) | Glycolic Acid ppm | Acetic Acid ppm | Methylene Glycol ppm | Chloroacetic Acid ppm |
| --- | --- | --- | --- | --- | --- | --- | --- |
| 0 | 2.5 | 2900 | 6340 | 4416 | 2460 | 0 | 514 |
| 6 | 2.8 | 2300 | 4850 | 2920 | 2130 | — | — |
| 12 | — | 1960 | 3630 | 1230 | 1745 | 367 | 139 |
| 16 | — | 1520 | 3280 | 950 | 1530 | | |
| 13 | — | | | | | | |
| 19 | — | — | — | 483 | — | 636 | 188 |
| 20 | — | — | — | 442 | — | 395 | 188 |
| 21 | — | — | — | 414 | — | 550 | 200 |
| 22 | — | 1400 | 2960 | 317 | 1290 | 536 | 163 |
| 25 | 2.5 | — | — | 297 | 1140 | 544 | 133 |
| 28 | 2.3 | 950 | 2530 | 100 | 1014 | 568 | 118 |
| 33 | 3.6 | — | — | 99 | 948 | 515 | 0 |
| 34 | 3.6 | 860 | — | — | — | — | — |
| 42 | 2.9 | 530 | — | 45 | 705 | 375 | 0 |

The average ppm of glycolic acid oxidized per day was 160 ppm and of acetic acid was 45 ppm. Converted to pounds per acre per day the average amount of glycolic acid and acetic acid removed was 230 and 65 lb/acre/day, respectively.

EXAMPLE 8

1800 ml of a waste solution from a salicylaldehyde production stream containing about 20 per cent by weight of sodium chloride and 0.7 per cent by weight of formic acid was treated as follows. The pH of the solution was adjusted to about 3 with concentrated HCl. About 10 ppm of iron was added to the solution as $FeCl_3 \cdot 6H_2O$ and the solution was then subjected to a 100 watt light source having a useful wave length range of from about 3000 to 4000 A and sparged with oxygen. Periodically the TOC of the aqueous solution was determined. The results of these tests are set forth in the following Table VI.

TABLE VI

| Time (minutes) | TOC Mg. C/Liter |
|---|---|
| 0 | 2538 |
| 197 | 2438 |
| 428 | 2346 |
| 1346 | 1842 |
| 2764 | 1574 |
| 3890 | 1035 |
| 5364 | 656 |
| 6714 | 468 |
| 8666 | 255 |
| 9579 | 219 |

EXAMPLE 9

A brewing waste solution obtained from a commercial brewing operation was first filtered to remove solids. To 1800 ml of the waste solution (at 25°C) was added sufficient concentrated HCl to lower the pH to 2.5. One hundred parts per million of iron (as $FeCl_3 \cdot 6H_2O$) were dissolved in the solution and the solution was then sparged with oxygen and subjected to light from a 100 watt light source having an effective wave length range of from about 2000 to about 4000 A. The solution was periodically analyzed for TOC, TOD, ethanol, carbohydrates as methyl cellulose, acetic acid, and other organic carbon. The results of these tests are set forth in the following TABLE VII.

TABLE VII

| Time (minutes) | TOD (Mg. O₂/Liter) | TOC (Mg. C/Liter) | Methyl Cellulose ppm | Ethanol ppm | Acetic Acid ppm | Other ppm |
|---|---|---|---|---|---|---|
| 0 | 3838 | 1123 | 760 | 360 | 13.7 | 14.3 |
| 80 | — | 1077 | — | — | — | — |
| 1062 | 2299 | 840 | 650 | 110 | 540 | 20 |
| 2628 | 786 | 512 | — | — | — | — |
| 3851 | 282 | 94 | — | — | — | — |
| 4948 | 163 | 32.8 | <10 | <2 | 76 | — |

In a second series of tests similar samples of a filtered brewery waste solution were treated as follows. One sample was treated in the presence of 10 ppm of iron (as $FeCl_2 \cdot 4H_2O$) with an oxygen sparge and a light source (100 watt, 2000–4000 A effective wave length). A second sample was treated in an identical manner except that no iron cations were dissolved into the solution. The TOC of the solution was determined at various time intervals. The results of the tests are set forth in the following Table VIII.

TABLE VIII

| Iron Present | | No iron | |
|---|---|---|---|
| Time (minutes) | TOC (Mg. C/Liter) | Time (minutes) | TOC (Mg. C/Liter) |
| 0 | 308 | 0 | 273 |
| 33 | 300 | 290 | 269 |
| 88 | 288 | 688 | 253 |
| 278 | 282 | 1211 | 245 |
| 555 | 213 | | |
| 1242 | 103 | | |

The TOC of the sample (with iron present) was lowered by about 67 per cent after 1242 minutes while the TOC of the second sample was only reduced by about 10 per cent after 1211 minutes.

EXAMPLE 10

Various parameters of the invention were changed in this series of tests to illustrate the critical importance of each.

In each test an aqueous solution (pH of 2.5) containing about 2200 ppm of glycolic acid, 5 per cent by weight of sodium chloride, and 50 ppm of iron was treated as follows.

In the first test a sample of the solution was sparged with nitrogen and subjected to a 100 watt light source having an effective wave length range of from about 3000 to about 4000 A. The TOC of the solution was periodically determined. The results of the test are set forth in the following Table IX.

TABLE IX

| Time (minutes) | TOC (Mg. C/Liter) |
|---|---|
| 0 | 877 |
| 65 | 861 |
| 234 | 858 |
| 715 | 852 |
| 1350 | 868 |

In the second test the aqueous solution was sparged with oxygen but not subjected to a light source. There was substantially no change in the TOC after a period of 1200 minutes.

In a third test an aqueous solution (pH 2.5) containing about 5 per cent by weight of sodium chloride and 900 ppm of glycolic acid was treated at a temperature of about 25°C with light (100 watt source, 3000–4000 A wave length) and an oxygen sparge but no iron was dissolved therein. After a period of 1125 minutes there was substantially no change in the TOC in the solution.

What is claimed is:

1. A process for oxidizing organic matter in an aqueous liquor wherein at least carbon dioxide is produced, and wherein said organic matter contains an electron donating atom which comprises:

while the pH of said aqueous liquor is maintained in the range of 2 to 4, mixing gaseous oxygen with the aqueous liquor in the presence of a catalytic quantity of solubilized iron cations ranging in an amount from about 1 to about 500 parts per million of said aqueous liquor while the aqueous liquor is subjected to light waves ranging in length from about 5800°A to about 2000°A at a temperature ranging from the freezing to the boiling point of said aqueous liquor at atmospheric pressure; and removing at least a major portion of said produced carbon dioxide thereby reducing the total organic content of said aqueous liquor.

2. The method of claim 1 wherein the light is sunlight.

3. The method of claim 1 wherein the pH of the aqueous liquor ranges from 2 to 3.

4. The method of claim 1 wherein the intensity of the light ranges from about 0.1 to about 100 k watt-hours per pound of organic compound dissolved in said aqueous liquor.

5. The method of claim 1 wherein the oxygen is supplied to the reaction system by dispersing air through said aqueous liquor.

6. The method of claim 1 wherein iron cations are present in an amount ranging from about 10 to about 50 ppm of the aqueous liquor.

7. The method of claim 6 wherein the pH of the aqueous liquor ranges from 2 to 3.

8. The method of claim 7 wherein the organic matter contains as the electron donor atom one or more of oxygen, nitrogen or sulfur.

9. The method of claim 1 wherein the liquor is at ambient temperature.

* * * * *

UNITED STATES PATENT OFFICE
CERTIFICATE OF CORRECTION

Patent No. 3,819,516  Dated June 25, 1974

Inventor(s) C.B. Murchison, R.E. Bailey, R.W. Diesen

It is certified that error appears in the above-identified patent and that said Letters Patent are hereby corrected as shown below:

In column 3, lines 7-8, replace "intensity" with --quantity--.

In column 3, line 8, replace "source" with --supplied--.

In column 3, line 25, replace "bout" with --about--.

In column 3, line 54, replace "einstein" with --the einsteins--.

In column 6, Table V, delete the fifth line.

In column 10, line 4, replace "intensity" with --quantity--.

Signed and sealed this 31st day of December 1974.

(SEAL)
Attest:

McCOY M. GIBSON JR.
Attesting Officer

C. MARSHALL DANN
Commissioner of Patents